United States Patent
Antrobus et al.

(10) Patent No.: US 9,718,341 B1
(45) Date of Patent: Aug. 1, 2017

(54) PNEUMATIC POWER AND DRAG SYSTEM

(71) Applicants: Craig Antrobus, Summerland (CA); Ibrahim Dincer, Oshawa (CA); Reza Mohammadali zadeh, Oshawa (CA); Calin Zamfirescu, Oshawa (CA)

(72) Inventors: Craig Antrobus, Summerland (CA); Ibrahim Dincer, Oshawa (CA); Reza Mohammadali zadeh, Oshawa (CA); Calin Zamfirescu, Oshawa (CA)

(*) Notice: Subject to any disclaimer, the term of this patent is extended or adjusted under 35 U.S.C. 154(b) by 0 days.

(21) Appl. No.: 15/279,175

(22) Filed: Sep. 28, 2016

(51) Int. Cl.
| | |
|---|---|
| *B60K 6/00* | (2006.01) |
| *B60K 17/356* | (2006.01) |
| *B60K 1/02* | (2006.01) |
| *B60L 7/10* | (2006.01) |
| *B60K 3/04* | (2006.01) |
| *B60L 11/18* | (2006.01) |
| *B62D 35/00* | (2006.01) |
| *B60H 1/00* | (2006.01) |
| *B60R 1/00* | (2006.01) |

(52) U.S. Cl.
CPC .......... *B60K 6/00* (2013.01); *B60H 1/00328* (2013.01); *B60K 1/02* (2013.01); *B60K 3/04* (2013.01); *B60K 17/356* (2013.01); *B60L 7/10* (2013.01); *B60L 11/1809* (2013.01); *B62D 35/00* (2013.01); *B60R 1/00* (2013.01); *B60R 2300/00* (2013.01)

(58) Field of Classification Search
CPC ... B60K 6/00; B60K 1/02; B60K 3/04; B60K 6/24; B60H 1/00328
See application file for complete search history.

(56) References Cited

U.S. PATENT DOCUMENTS

| | | | | |
|---|---|---|---|---|
| 4,361,204 A | * | 11/1982 | Earle | F01B 17/02 180/302 |
| 8,701,804 B1 | | 4/2014 | Antrobus | |
| 9,038,390 B1 | * | 5/2015 | Kreuger | F01K 23/02 60/655 |
| 2005/0172631 A1 | * | 8/2005 | Primlani | F23C 99/00 60/698 |
| 2011/0100738 A1 | * | 5/2011 | Russo | B60K 6/24 180/65.245 |
| 2011/0115223 A1 | * | 5/2011 | Stahlkopf | F01K 13/02 290/7 |
| 2013/0241204 A1 | * | 9/2013 | Brookman | F01K 15/02 290/52 |

(Continued)

*Primary Examiner* — Hau Phan

(57) ABSTRACT

Power systems, heat exchanger systems, electrical regeneration systems and air drag reduction systems for a wheeled vehicle are provided. The systems comprise a vehicle that includes a compressed air system and electrical system. The power and drag reduction system also comprises a plurality of pneumatic motors, one each connected to each wheel, the pneumatic motors using compressed air to drive each wheel. The electrical system supports vehicle braking and regenerates electricity for vehicle batteries. A heat exchanger heats expanding air and is configured to substantially evenly distribute said heated air to the pneumatic motors. Air from a front grill is diverted to impellers that turn electric generators to regenerate power and reduce drag. A drag reducing arrangement blending mirrors with camera into the vehicle body is included as is a plug-in 120-volt trickle charge system and a quick charge (DC) system for battery charging.

19 Claims, 10 Drawing Sheets

(56) References Cited

U.S. PATENT DOCUMENTS

2014/0261288 A1* 9/2014 Coney .................... F02G 3/00
                                                    123/197.1
2016/0297304 A1* 10/2016 Brookman ............. B60K 3/04

* cited by examiner

PNEUMATIC POWER AND DRAG SYSTEM

FEDERALLY SPONSORED RESEARCH OR DEVELOPMENT

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a power system. More particularly, certain embodiments of the invention relates to a vehicle power system.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, conventional motor vehicles may be powered by combustion. Conventional combustion motors may include a combustible liquid such as petrol, wherein an expansive force from heating the liquid may cause a piston of the engine to move, and thus creating work. This work may prorogate through a multiplicity of shafts and axe's, typically known as a drivetrain, to a coupled wheel and may deliver the work to the wheel in a form of torque which may cause the wheel to turn. Some other conventional motor vehicles may be powered by electricity. Conventional electric motors may include current supplied to a stator from a battery, wherein the stator may then become energized to create a rotating magnetic flux. The flux may generate a magnetic field which may result in a current being produce in a rotor position within the stator. The rotating flux and the current may produce a force wherein that force may propagate torque to a coupled wheel. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that with conventional combustion motors, an exhaust, after a combustible liquid has gone through combustion, may need to be expelled. Typically, the exhaust may be expelled into the atmosphere. Furthermore, much of the power created by the combustion may be used to move moving parts of the drivetrain before torque may be delivered to a coupled wheel. With conventional electric motors, a cost to produce such a system may typically be more expensive than the conventional combustion motor. Moreover, the battery which supplies current to the electric motor may only be recharged by plugging the battery into a power supplying station.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A and FIG. 2B illustrate operational component diagrams of an exemplary pneumatic power and drag reduction systems, in accordance with an embodiment of the present invention, wherein FIG. 2A illustrates operational air flow components, in accordance with an embodiment of the present invention, and FIG. 2B illustrates operational electricity flow components thereof;

FIG. 4B illustrates a top view thereof;

Unless otherwise indicated illustrations in the figures are not necessarily drawn to scale.

DETAILED DESCRIPTION OF SOME EMBODIMENTS

The present invention is best understood by reference to the detailed figures and description set forth herein.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments, the pneumatic power system may also work in conjunction with electric motors. The electric motors may provide electricity to components used in the pneumatic power system. This feedback functionality may make the pneumatic powering system more efficient and thus the cost of travel may be quite inexpensive as compared to conventional passenger vehicles.

It may be contemplated that in many embodiments, a cost to manufacture, use, and maintain a vehicle in accordance with an embodiment of the present invention, may be far less than conventional combustion vehicles or conventional all electric vehicles. In some embodiments, greenhouse gas emissions may be far less than with combustion vehicles or conventional all electric vehicles. In many embodiments, the pneumatic power system may be much safer than conventional all electric vehicles or conventional combustion vehicles. In many embodiments, it may be contemplated that a pneumatic system may refill faster than all-electric vehicles, a refilling may take 7.7 minutes. Furthermore, it may be further contemplated that in some embodiments a driving range of a vehicle powered by the pneumatic power system may be approximately 328 km before needing to refuel.

Figure 1:
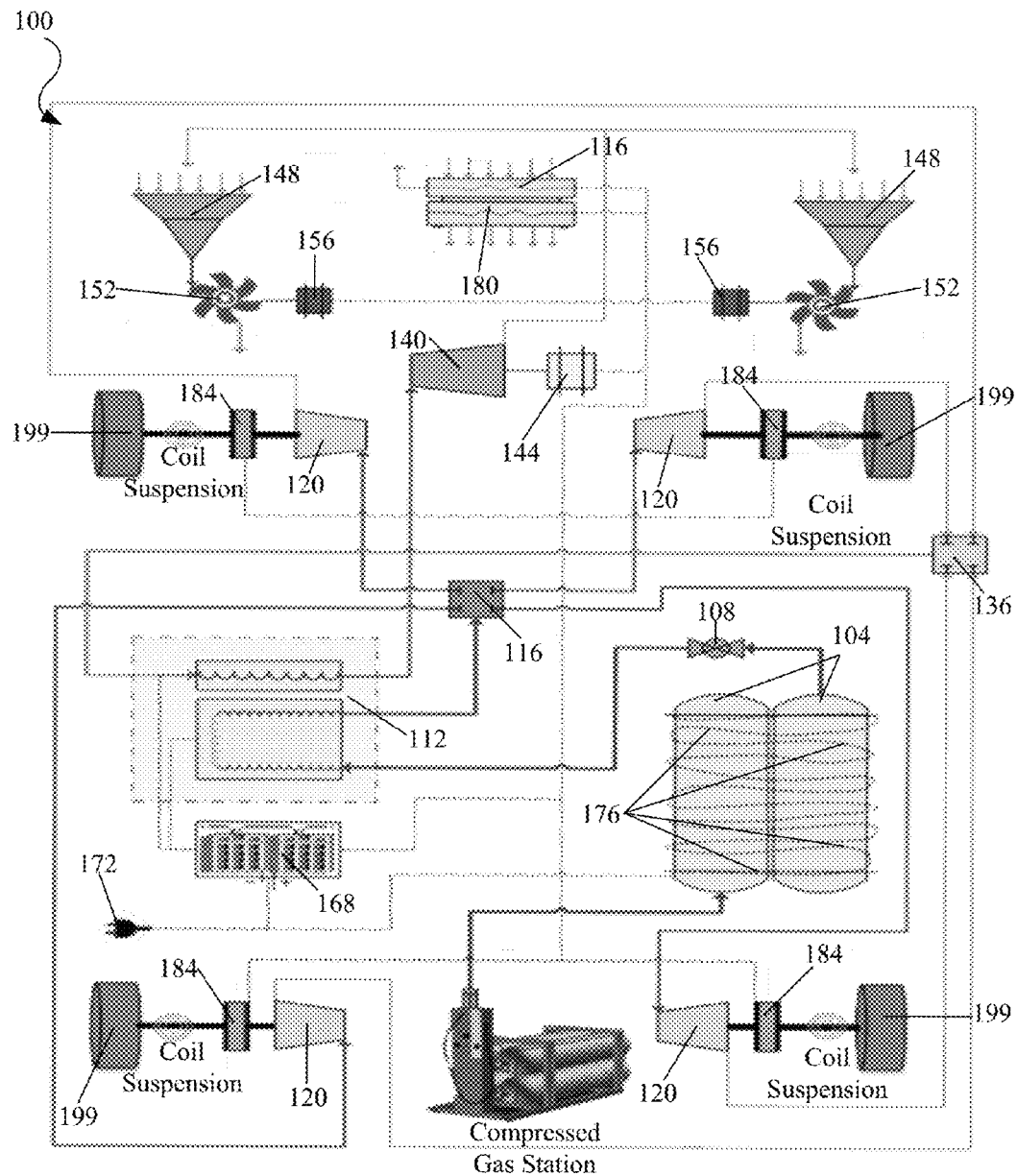
FIG. 1 illustrates an exemplary embodiment of a pneumatic power and drag reduction systems architecture of a vehicle, in accordance with an embodiment of the present invention

FIG. 1 illustrates an exemplary embodiment of a pneumatic power and drag reduction systems architecture of a vehicle 100, in accordance with an embodiment of the present invention. In the present embodiment, the pneumatic power system architecture may include an air storage device 104, a regulator device 108, a first heating unit 112, a multidirectional output valve 116, four pneumatic motors 120, an exhaust multidirectional valve 136, an exhaust motor 140, a first generator 144, an intake grill system 148, two impellers 152 two generators 156, a battery 168, a plug-in charging system 172, a second heating unit 176, a heat pump device 116, an auxiliary heating element 180, four electric motors 184, a multiplicity of wheels 199.

In many embodiments the pneumatic power system may be, for example, and without limitation, a compressed air power system, wherein the air storage device may be configured to store compressed air. Furthermore, in the present embodiment, air storage device 104 may be operably coupled to a compressed gas station, such that, the air storage device may be connected to a compressed air pump and filled with compressed air. In some exemplary alternative embodiments, the air storage device may include a multiplicity of operably coupled tanks, wherein each tank may be in a range of particular sizes, volumes, shapes, and structures. Air storage tanks may be fiber composite tanks approximately 22 inches in diameter and 4 feet long capable of holding approximately 13,000 PSI.

In the present embodiment the air storage device may also be operably coupled to regulator device 108. In some embodiments the regulator device may include a pressure regulator such as, without limitation, a single stage pressure regulator or a double stage pressure regulator. In the present embodiment, the regulator device may reduce an air flow pressure output from the air storage device to an optimal operating pressure.

In the present embodiment, the regulator device may further be operably coupled to first heating unit 112, wherein the first heating unit may include a heat exchanger comprising Phase Change Materials (PCM)s, such as, and without limitation paraffin, fatty acids, salt hydrates, eutectics, and hygroscopic materials, or any combination thereof. The first heating unit may store low temperature heat (thermal energy) captured, in phase change materials, from air expansion. A heat transfer may occur when a material changes from solid to liquid, or liquid to solid. Therefore, when ambient temperature is low, these solid-liquid PCMs may perform like self-regulating thermal storages, wherein their temperature may rise as they absorb heat. When a PCM temperature reaches a melting point, a PCM may absorb and release heat at a nearly constant temperature. Furthermore, in some exemplary alternative embodiments, the heat exchanger may be configured to be, for example, and without limitation, a shell and tube heat exchanger, a plate fin heat exchanger, a fluid heat exchanger, a phase-change heat exchanger, or a direct contact heat exchanger wherein the heat exchanger may also be configured to have a multiplicity of air input ports and heated air output ports. In the present embodiment, the first heating unit 112 may utilize an electric charge from battery 168, each of generator 144 and 156, plug-in charge system 172, and each of electric motors 184 to heat the air to an optimum operation temperature.

Furthermore, in the present embodiment, air may be directed from the first heating unit 112 into, operably coupled, multidirectional output valve 116, wherein the multidirectional output valve may include at least one input port for receiving air from the first heating unit 112, and may further include at least four output ports for directing the air to the four pneumatic motors 120.

In some exemplary alternative embodiments, the four pneumatic motors 120, may include, for example, and without limitation, compound engine motors, multi-stage expansion motors, a four-stage expansion motor, rotary vane motors, a turbine or any combination thereof, wherein compressed air may travel through stages of the motors and impart energy, and thus expand, to move a multiplicity of pistons and a central shaft throughout the stages. Furthermore, downstream stages may use exhaust from upstream stages, such that a final exhaust may be of a lower energy state (expanded and cooler) than an initial energy state (compressed and warmer). In the present embodiment, respective central shafts of the four pneumatic motors 120, may be directly connected to respective wheels 199 of the vehicle, and thus power may be transmitted directly to the wheels as opposed to possibly having to propagate through a multiplicity of powertrain elements as with conventional vehicles. It may be contemplated that the direct connection may greatly improve efficiency as it may eliminate a substantial amount of mechanical friction losses associated with moving the multiplicity of powertrain elements.

When air may be expanded with a large expansion ratio, temperature of the air may reduce dramatically, furthermore, if there may be any moisture in the air, it may cause freezing which affects the above described pneumatic motor operation. In order to possibly avoid this problem, this system requires heat addition before expansion. Increasing air temperature before entering the pneumatic motors may increase system work potential and may directly improve system efficiency. Furthermore, in the present embodiment, the pneumatic motors each may be operably coupled to exhaust multidirectional valve 136, wherein used air from the four pneumatic motors 120, may be directed to the exhaust multidirectional valve 136. The exhaust multidirectional valve may include at least four input ports for receiving air from each of the pneumatic motors, and may further include at least one output port for directing the gas back to first heating unit 112.

First heating unit 112 may also be operably coupled to exhaust motor 140, wherein the exhaust motor may be for example, and without limitation, a turbine. In the present embodiment, the exhaust motor may be operably connected to fast generator 144, wherein the first generator may be an electric generator and exhaust motor 140 may drive the first generator 144 to produce an electric charge. The exhaust motor may also be operably coupled to intake grill system 148.

In some embodiments, intake grill system 148 may include a single unit comprising a multiplicity of portions substantially spread across an entire front of the vehicle, wherein an outer portion may further include diverters for diverting intake air to at least, impellers 152. The outer portion may include a multiplicity of edge portions. In the present embodiment the intake air that may be diverted may be exhaust air from the exhaust motor mixed with air from an external atmosphere of the vehicle. In some alternative embodiments, portions of the intake grill system may include for example, and without limitation, a mesh structure, vertical or horizontal bars, open scoops, hood scoops and side scoops, or any combination thereof that may provide air to be taken into the portions of the intake grill system.

In the present embodiment, portions of the grill intake system 148 may be operably coupled to impellers 152. In some alternative embodiments the impellers may be configured to be, for example, and without limitation, open, semi-open, closed or shrouded. Furthermore, in the present embodiment the impellers 152 may be operably connected to generators 156, wherein the generators 156 may be electric generators. Air directed to the impellers may act on the impellers which may drive the generators 156 respectively to produce an electric charge.

In the present embodiment, each of the three generators 144 and 156, may be operably coupled to at least battery 168, wherein the battery may receive the charge produced by each generator. Furthermore, in the present embodiment, battery 168 may be an advanced rechargeable Li-Ion battery with 0.875 MJ/kg total charge, 2 MJ/l energy density, and 90% charge discharge efficiency. In some embodiments, the battery may be used until the charge depletes to 20% of the total charge. Available battery storage may be of 0.7 MJ for 1 kg of battery. In some embodiments, an optimum battery may be 125 kg with a capacity of 24 kWh and a battery volume of 75l. In the present embodiment, battery 168 may include plug-in charging system 172, wherein the plug-in charging system may be configured to include two different sub-systems. In some embodiments, one sub-system of the plug-in charging system may be a 120-volt trickle charge system for long session charging periods, for example, and without limitation, when an operator may wish to charge the battery overnight, and/or when an operator may be at work or other function, and/or substantially any time in which an operator may desire to spend a relatively long period of time charging 172. With this sub-system, charge may also be sent to second heating unit 176 for powering of the second heating unit, wherein the second heating unit may include heat trace lines. In many embodiments, heat trace lines may include cables comprising high resistance wire in physical contact with gas storage device 104, wherein current applied to the heat trace lines may increase the temperature of the heat trace lines and thus increase the surface temperature of the gas storage device. In some alternative embodiments, the second heating unit may be configured to be heat trace lines configure as, for example, and without limitation, a constant electric power series, a constant electric power zone, self-regulating, 12 volt DC insulated cable capable of a minimum 9 watts per foot length of cable or any combination thereof. In some embodiments another sub-system of the plug-in charging system may be a quick charge (DC) system that may quickly charge the battery during relatively short momentary time periods such as, and without limitation, an operator briefly stopping to refuel the air storage devices, and/or an operator briefly stopping at a charging station while en route to a particular destination, and/or substantially any time in which an operator may desire to spend a relatively short period of time charging battery 168. With this sub-system, charge may also be sent to the first heating unit 112 for powering of the heating unit.

In the present embodiment battery 168 may also be operably coupled to heat pump 180, wherein the heat pump may be configured as a reversible heat pump and thus may include a heating mode and a cooling mode. Heat pump device may further be operably coupled to a portion of the intake grill, wherein environmental air passing through the in-take grill may be directed into and through the heat pump.

In the present embodiment, battery 168 may be operably coupled to the three generators, the first heating unit 112, the heat pump 116, auxiliary heating element 180, and a charging station via the plug-in charging system 172, as described above. Also, in the present embodiment, battery 168, may further be operably coupled to four electric motors 184.

In the present embodiment, four electric motors 184 may be operably coupled to the battery, each wheel respectively, a brake pedal of the vehicle, and the first heating unit such that, regenerative braking may be engaged by applying pressure to the brake pedal, and thus causing the electric motors to produce electricity to recharge the battery In some alternative embodiments, a front of an intake grill system may include a relatively small diameter mesh, lining the front of the intake grill to prevent debris from entering the air flow system. In another alternative embodiment, the intake grill system may include a switch actuated wiper to remove debris that may be blocking an intake grill system.

In many alternative embodiments, a pneumatic power system may include a switching device which may be operably coupled to a first heating unit 112, a second heating unit 176, a heat pump 116, auxiliary heating element 180, three generators 156, and 144, a battery 168, and the four electric motors 184, wherein the switch device may be configured with executable instructions to direct electricity to particular components for the needs of particular applications, such as, and without limitation, recharging the battery, powering the heating units, activating particular electric motors for braking receiving electricity from the electric motors, and/or receiving electricity from the generators. Furthermore, in some alternative embodiments, the switching device may be configured to be a processor such as, without limitation, a microprocessor, programmable intelligent computer (PIC™) chip, a PlCmicro™ chip, a programmable logic controller (PLC), a programmable logic relay (PLR), a PLC on a Chip™, a field programmable gate array (FPGA) or any combination thereof. In some alternative embodiments, at least one of the three generators, and any combination thereof may be operably coupled to at least one a first heating unit 112, a second heating unit 176, a heat pump 116, auxiliary heating element 180 and any combination thereof, wherein electricity may be directly provided to the at least one first heating unit 112, second heating unit 176, heat pump 116, auxiliary heating element 180 and any combination thereof, by ant one of the three generators, and any combination thereof. Furthermore, the electricity may be directly provided when a power saving mode may be switched on. In some alternative embodiments an operator may trigger buttons to drive electricity to or away from particular components operably connected to a switching device. In some other alternative embodiments driving electricity to or away from particular components may be automatically triggered by an on-board processor receiving data from temperature and pressure sensors installed throughout a vehicle. In yet another alternative embodiment, driving electricity to or away from particular components may be automatically triggered by a remote processor in wireless communication with an on-board processor, wherein temperature and pressure sensors installed throughout the vehicle may communicate data to the on-board computer. In some other alternative embodiments, a switching device may be configured to process sensed feedback from a device operably coupled to the switching device.

Figure 2A:
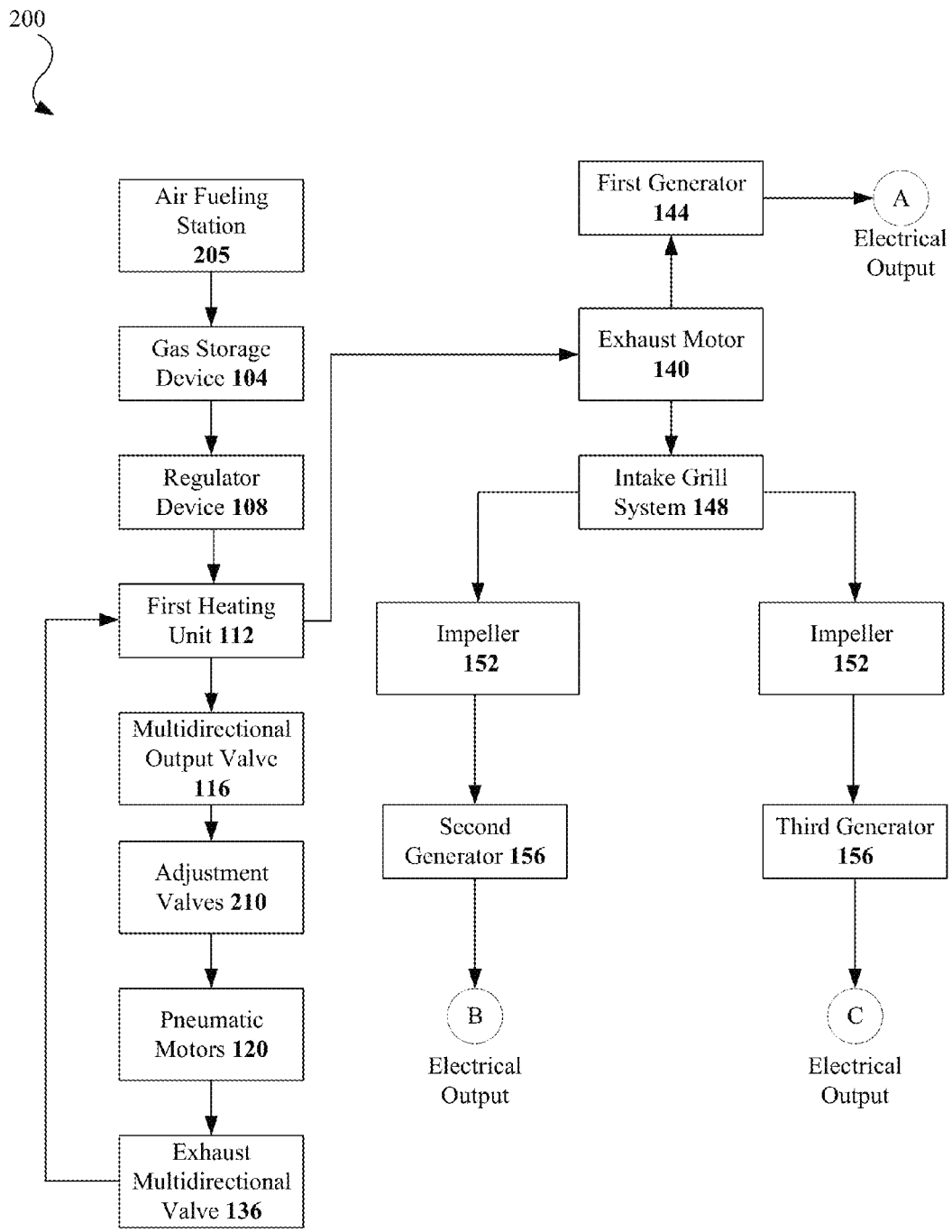
Figure 2B:
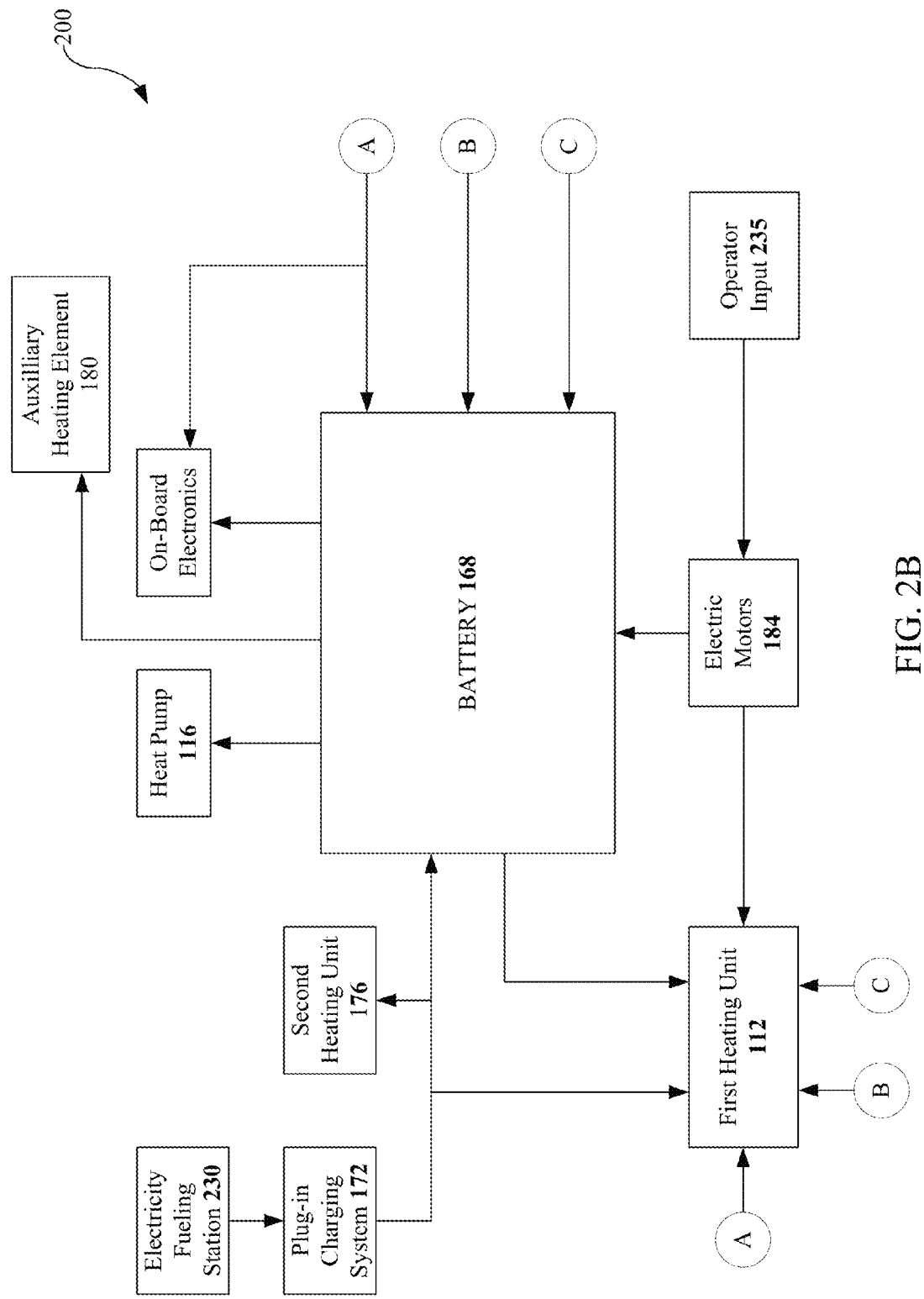

FIG. 2A and FIG. 2B illustrate operation component diagrams of an exemplary pneumatic power and drag reduction systems 200, in accordance with an embodiment of the present invention, wherein FIG. 2A illustrates operational air flow components, in accordance with an embodiment of the present invention. In the present embodiment, and with reference to FIG. 1, a gas refueling station 205 may be configured to inject and fill air storage device 104 with cool, dry clean air, wherein a gas refueling station may be a large size specialized station used for fast filling of the gas storage device with clean, dry air. In some other alternative embodiments, the air storage device may be filled with substantially any non-flammable air. In the present embodiment the air filled gas storage device 104 may be configured to be filled to a pressure of, for example, and without limitation, 13,000 PSI. During acceleration, the air in the air storage device 104 may travel to regulator device 108, wherein the regulator device may be configured to reduce the pressure from the exemplary 13,000 PSI to an exemplary, without limitation, 300 PSI. In some embodiments, 300 PSI may be an optimal operating pressure for the pneumatic motors. The reduced pressure air may then pass through the first heating unit 112, wherein the first heating unit may be configured to heat the air to an optimum operating temperature for the pneumatic motors. The heated air may then travel to multidirectional output valve 116 wherein, the multidirectional output valve may be configured to evenly distribute the heated air and further may direct the distributed air toward folk pneumatic motors 120. Each pneumatic motor may be configured to include a respective adjustment valve 210 located upstream from each pneumatic motor such that the distributed air may pass through each of the adjustment valves respectively before reaching a particular pneumatic motor. The adjustment valves may be configured to provide air adjustments to the pneumatic motors when the vehicle may be turning. Exhaust (exiting air sent through the pneumatic motors) from each of the pneumatic motors may be combined together in the exhaust multidirectional valve 136, wherein the exhaust multidirectional valve may be further configured to pass the combined air back to the first heating unit 112. The first heating unit may be configured to again heat the air to an optimum operating temperature and then may pass the reheated air to the exhaust motor 140. The exhaust motor may be configured to have the reheated air pass through the exhaust motor and further be configured to power the first generator 144 to possibly produce electrical output. The exhaust motor may also be configured to provide exhaust air to a portion of the intake grill system 148. The portion of the intake grill system may be configured to collect the exhaust air and may also collect external environment air which may have come through the intake grill system from outside the vehicle. The portion of the intake grill system may further be configured to pass the collected air through the impellers 152 simultaneously. Each of the impellers may be configured respectively to have the collected air pass through each of the impellers. The impellers may be further configured to power generators 156 to possibly produce electrical output. Furthermore, each of the impellers may further be configured to provide exhaust that travels to front tires, wherein an airspeed of the exhaust may be a reduced speed with respect to an airspeed before passing through each of the generators 156 respectively. Moreover, the reduced airspeed air may provide an air screen as an active aerodynamic, which may divert oncoming air around a front tire which may reduce the drag of the vehicle by 10% and may subsequently increases a cruise driving range.

Furthermore, FIG. 2B, illustrates operational electricity flow components, in accordance with an embodiment of the present invention, and with further reference to FIG. 1, plug-in charging system 172 may be configured to be plug into an outlet at an electricity fueling station in FIG. 2A listed as 205. In return, the electricity fueling station may be configured to provide electrical charge to the plug-in charging system. The plug-in charging system may be configured to provide electric charge to battery 168, first heating unit 112 and second heating unit 176. In a case that the second heating unit 176 may be receiving electrical charge, it may keep the air storage device warm during cold weather so the vehicle may be started easily. Furthermore, the battery 168 may be configured to receive additional electric charge from the generators 144, and the battery 168 may be further configured to provide electricity to the vehicle for on-board power needs. In the present embodiment, battery 168 may further be configured to send electrical charge to the first heating unit 112, heat pump 116, auxiliary heating element 180 and to the vehicle for on-board power needs. Moreover, in the present embodiment, each of four electric motors 184+ may be configured to receive input 235 from an operator pressing and/or releasing a brake pedal. In response to an operator applying pressure to the brake pedal, each of the electric motors may begin operating as generators, producing electricity and providing electricity to the battery 168. Simultaneously, each of the electric motors may also begin slowing wheel rotation of the vehicle and thus may execute regenerative braking. As more pressure may be applied to the brake pedal, the electrical motors may become more engaged and thus may slow the vehicle more quickly. In a case that a braking speed may not be sufficient, when full force may be applied to the braking pedal, standard disc brakes may be applied to stop the vehicle completely. In the present embodiment, regenerative electricity may be generated at least by the regenerative braking, air passing through the generator 144 and air passing through second and third generators 156.

Figure 3:
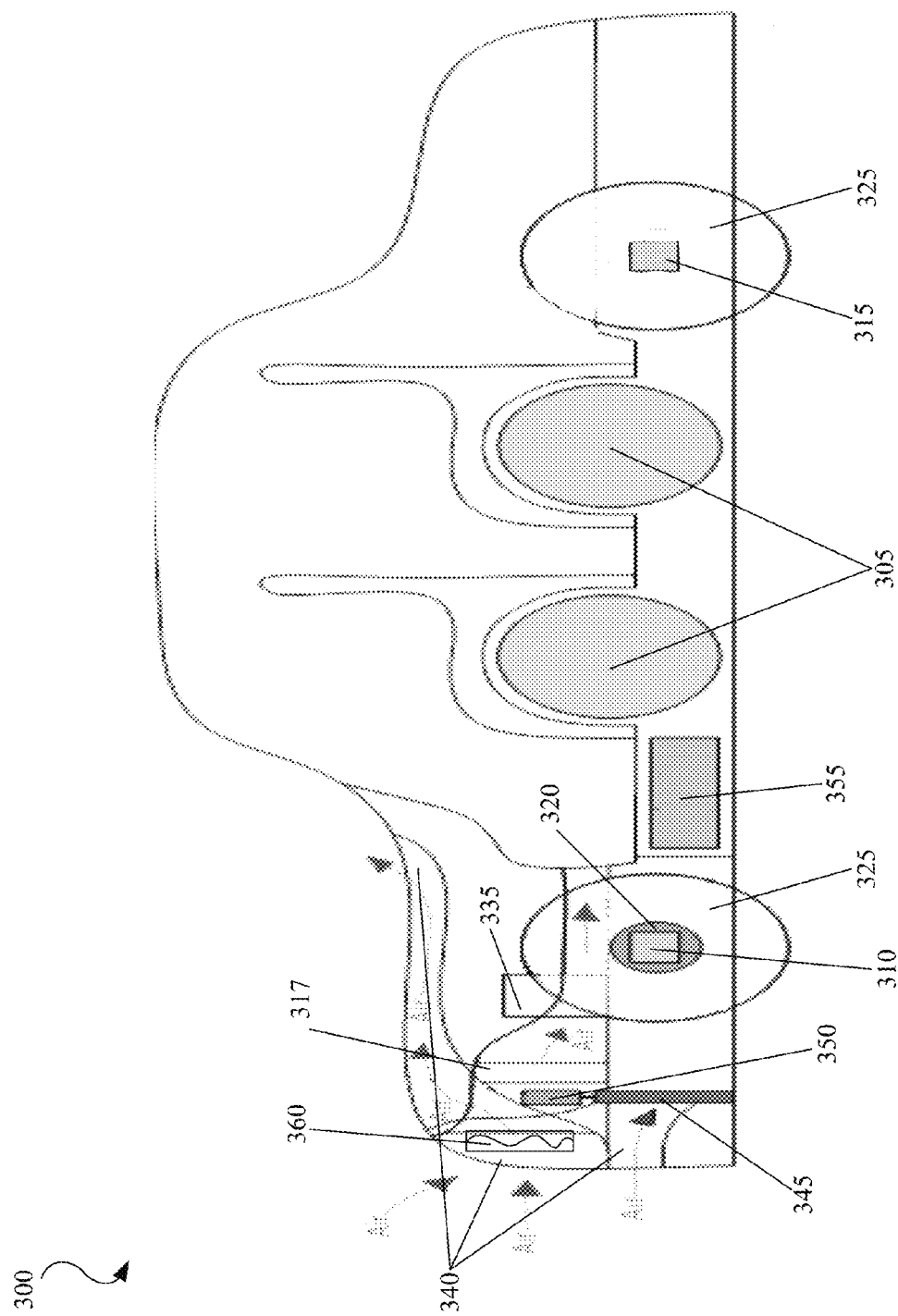
FIG. 3 illustrates a side view of another exemplary embodiment of a pneumatic power and drag reduction systems architecture of a vehicle, in accordance with an embodiment of the present invention.

FIG. 3 illustrates a side view of another exemplary embodiment of a pneumatic power and drag reducing systems architecture of a vehicle 300, in accordance with an embodiment of the present invention. In the present embodiment, the pneumatic power system architecture may include an air storage device 305, wherein the air storage device 305 may include a multiplicity of storage devices. In the present embodiment the storage devices may be configured to be cylindrical or circular shaped tanks. Furthermore, the multiplicity of storage devices may be fixed to the vehicle at a different position with respect to each other, wherein the different positions may include a distance large enough for a person to fit between. The different positions may also include under a front and back seat.

In the present embodiment, the pneumatic power system architecture may further include four pneumatic motors 310 and 315, and wheels 325, wherein the pneumatic motors and the electric motors may be positioned adjacent to each other directly on an axel of the wheels 325.

In the present embodiment, the pneumatic power system architecture may also include a battery 335, wherein the battery may be position within a front portion of the vehicle. In some other embodiments, a battery may only provide electricity to and receive electricity from electrical components located in a same general portion.

In the present embodiment, the pneumatic power system architecture may also include an intake grill system 340, an impeller 345, a generator 350, a heating unit 355, and a heat pump device 360 and auxiliary heating element 317. The intake grill system may include a multiplicity of air intake portions, wherein the air intake portions may direct external environmental air to flow to a multiplicity of portions of the vehicle. The multiplicity of air intake portions may direct external environmental air toward at least a windshield portion, an under vehicle portion, and front tire portions of the vehicle. The directed external environmental air may act as an air blanket to reduce a drag coefficient. One of the multiplicity of air intake portions may direct environmental air to flow through the impellers and further to front wheels 325 and/or to the under vehicle portion. This may cause the impellers to power the generators 350 which in turn may provide electricity to the battery system while also reducing drag by the flow of air acting as a wind screen for the wheel. Furthermore, another one of the multiplicity of air intake portions may direct environmental air to flow through a portion of the heat pump device to provide heated or cooled air to a windshield portion of the vehicle, wherein the heat pump may include a coiled portion. This may further reduce a drag coefficient. The air entering the intake grill system may also reduce the air travelling under the vehicle and thus reduce drag, and create a smooth surface under the car, which may further reduce drag. Exhaust in front of the front tires may act as a wind curtain that may direct the air around the front tires thereby also reducing drag. The wind curtain and the air entering the intake grill system may also reduce the air travelling under the car and thus also reducing lift which again reduces a drag coefficient.

Figure 4A:
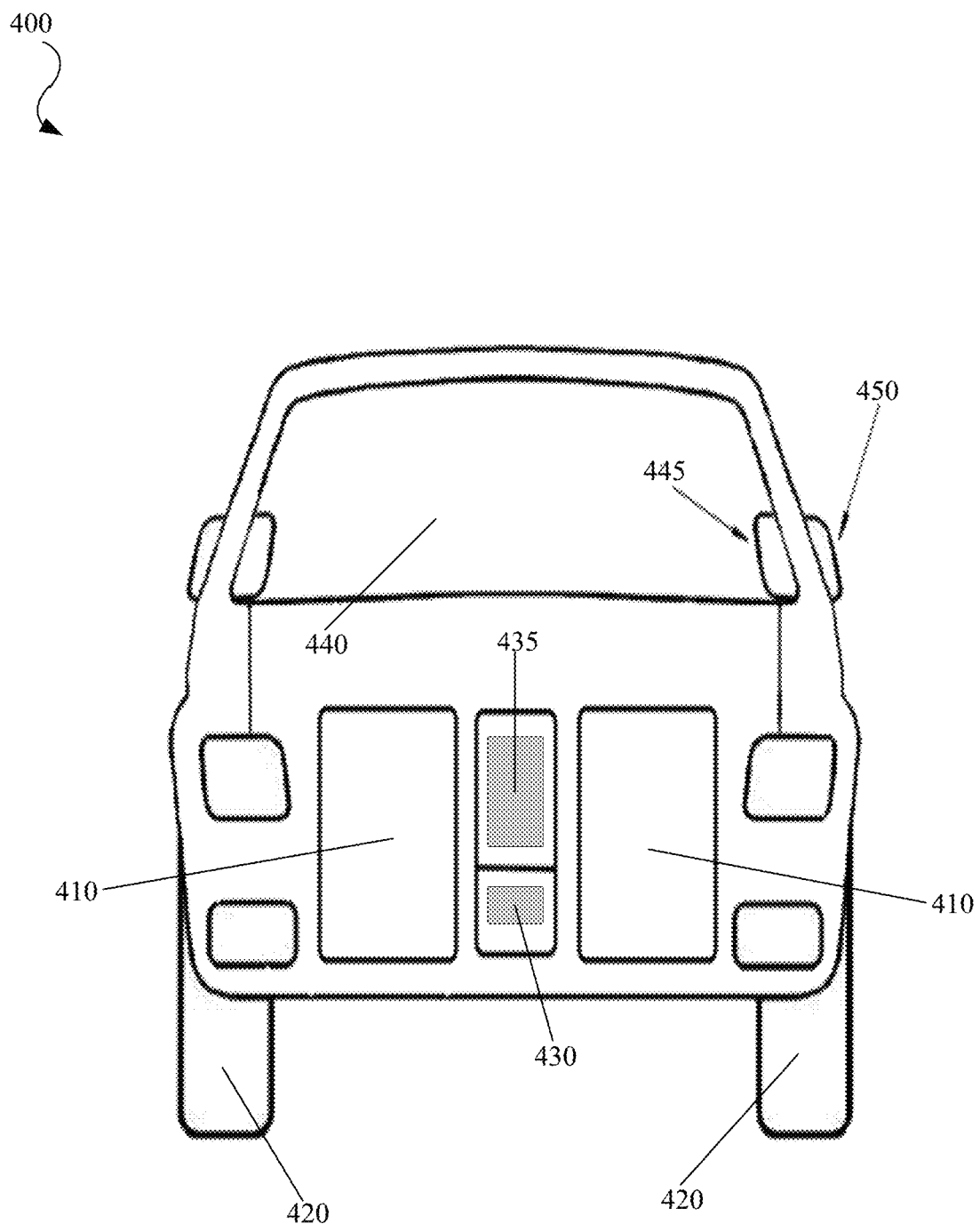
FIGS. 4A and 4B illustrate a multiplicity of views of an exemplary embodiment of some pneumatic power and drag reduction systems components of a vehicle, in accordance with an embodiment of the present invention, where FIG. 4A illustrate a front view, in accordance with an embodiment of the present invention
Figure 4B:
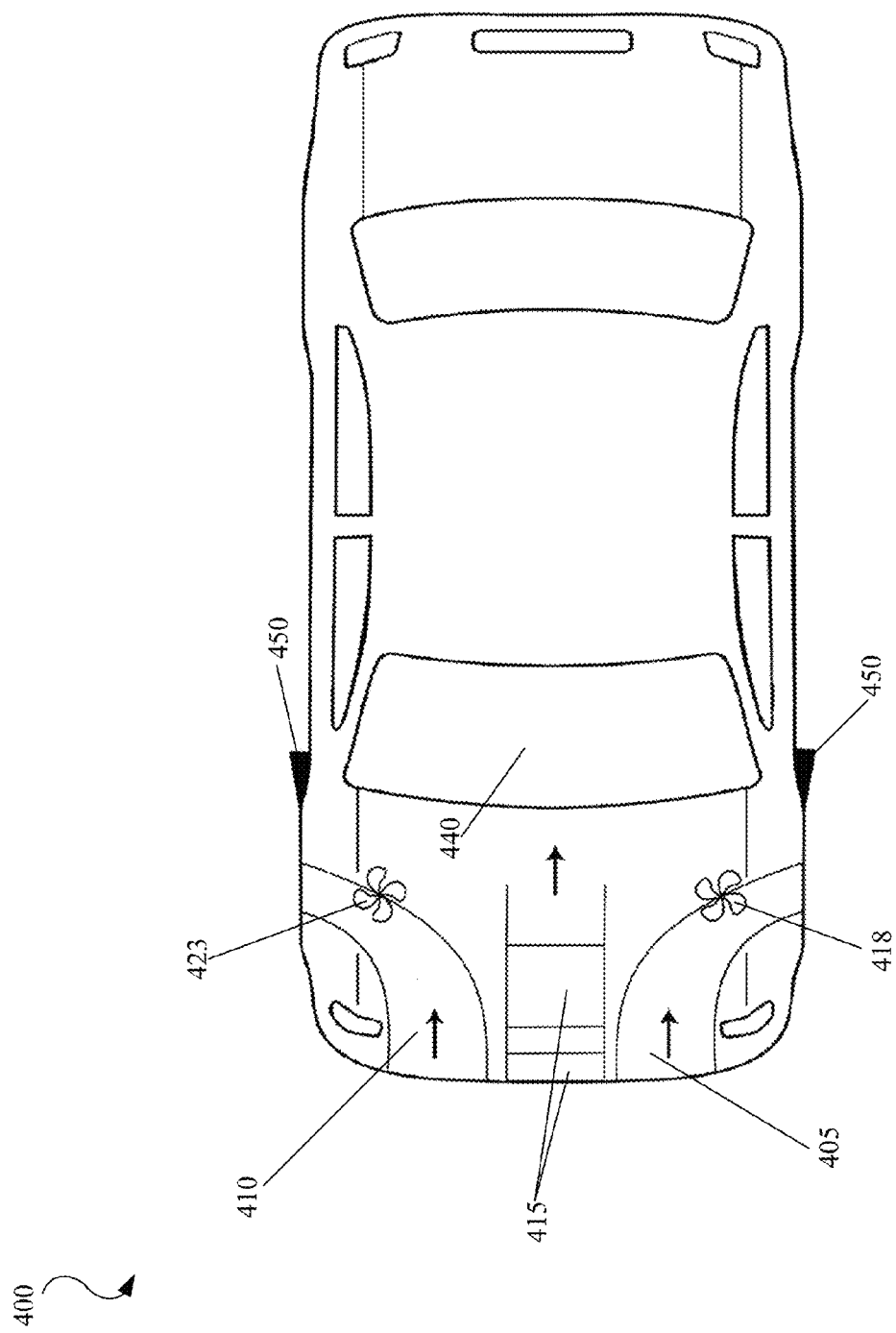

FIGS. 4A and 4B, illustrate a multiplicity of views of an exemplary embodiment of some pneumatic power system components of a vehicle 400, in accordance with an embodiment of the present invention, where FIG. 4A illustrate a front view, in accordance with the embodiment, and FIG. 4B illustrates a top view thereof. In the present embodiment the pneumatic power system may include a multiplicity of portions of an intake grill system, wherein the intake grill system may further include a two side portions 410, and two central portions 430 and 435. The side portions may allow external environmental air to enter the intake grill system and be directed pass an impeller 418 (FIG. 4B) exiting towards the front tires 420. Also, external environmental air travelling through the intake grill system may combine with exhaust air from the exhaust motor (not illustrated in FIG. 4A or FIG. 4B but is illustrated in FIG. 1), and would generate electricity by turning the impellers 418 and 423 which may drive generators to charge batteries. In the present embodiment, the power system may also include an electrically powered auxiliary heating element 430 and a heat pump 435, wherein during extreme cold temperatures, the electrically powered auxiliary heating element may provide heat for the vehicle. Furthermore, the central portion of the intake grill system may allow external environmental air to enter the intake grill system and be directed toward both the electrically powered auxiliary heating element and the heat pump, wherein the heat pump may cool or heat the air as it may be further directed toward windshield 440.

Also, in the present embodiment, the vehicle may further include a multiplicity of side mirrors, wherein at least one of the side mirrors may include at least two portions. A first portion 445 may be position inside a cabin of the vehicle and a second portion 450 may be positioned outside the cabin of the vehicle. The second portion may include a mirror and a high frame rate video camera, both pointing in a rearward and side direction with respect to the vehicle to possibly allow an operator to visualize rearward and side surroundings. The high frame rate video camera may continuously capture images while the vehicle may be running. Furthermore, the first portion may include a display to continuously display image information captured by the high frame rate video camera of the second portion so as to possibly provide a real-time wide angle view which may eliminate potential blind spots. In some alternative embodiments, the vehicle may further include a set of side Mirror control switches, wherein the control switches may allow an operator to rotationally adjust the mirror of the second portion and further independently adjust the camera of the second portion. The control switches may allow for camera zooming, panning, translation, and a transition into a night vision mode or thermal imaging mode to possibly allow for better operator visualization at night and/or in inclement weather. The control switches may also further provide an operator the ability to adjust display setting such as brightness, contrast, and sharpness etc., to better visualize the displayed image information. In some alternative embodiments a video camera may include image object detection functionalities to visually mark particular image objects that may move into a field of view of the video camera.

Figure 5:
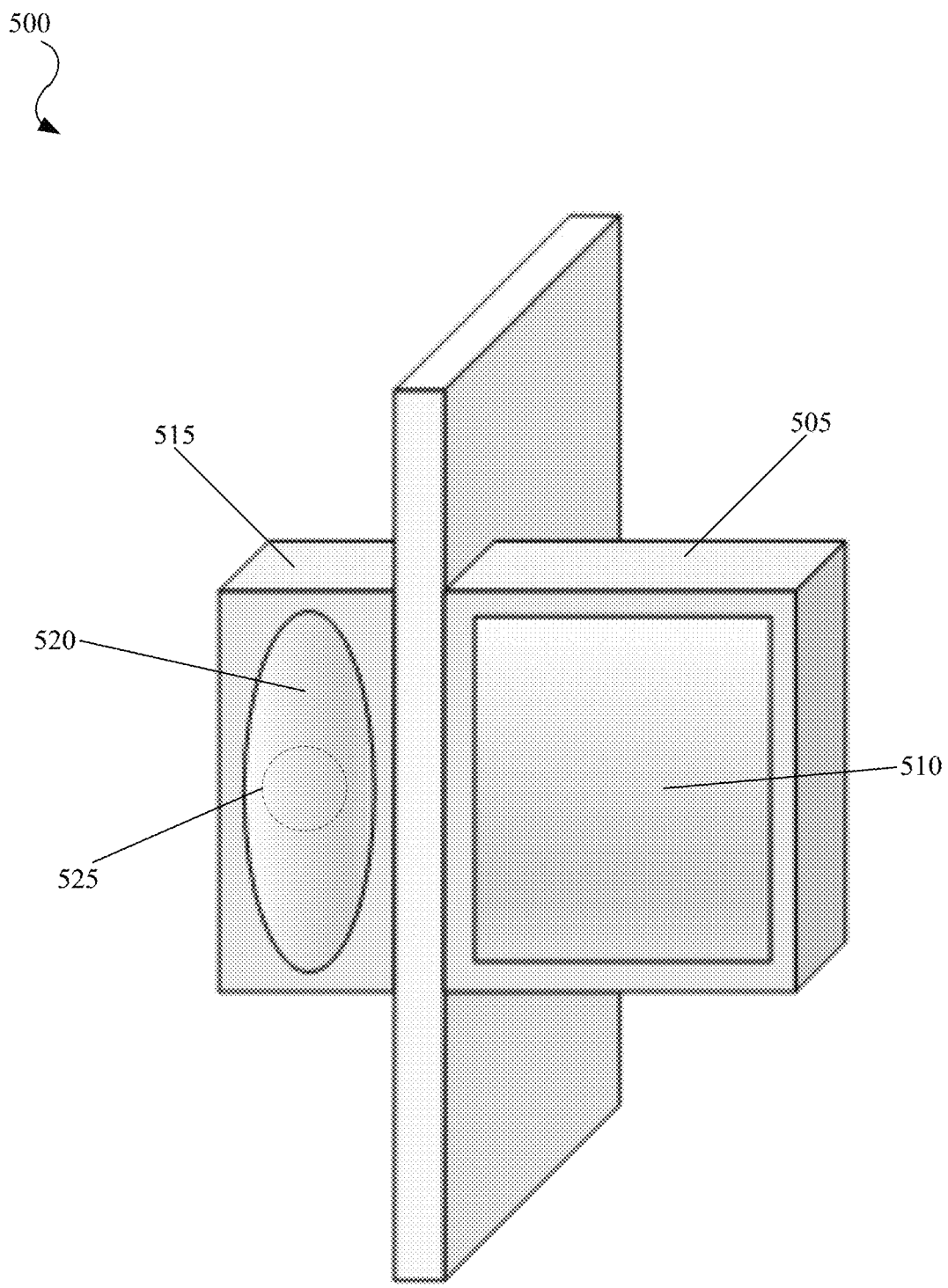
FIG. 5 illustrates an exemplary pneumatic power system component, in accordance with an embodiment of the present invention.

FIG. 5 illustrates an exemplary drag reduction and safety system component 500 in accordance with an embodiment of the present invention. In the present embodiment, the drag reduction and safety systems components may include a blended mirror camera display system, wherein the blended mirror camera display system may further include at least two portions. A first portion 505 may be position inside a cabin of a vehicle, wherein the first portion may be configured to include a housing that contains a display device 510. A second portion 515 may be position outside the cabin of the vehicle, wherein the second portion may be configured to include a housing that contains a mirror 520 and a camera 525. In the present embodiment, mirror 520 may be configured to be a one-way mirror, wherein a reflective side may be directed toward the rear and side of the vehicle which may allow an operator to see rear and side surroundings of the vehicle. Furthermore, camera 525, may be configured to be a video camera to continuously capture image data in a field of view of the camera. The camera may be positioned inside of the second portion housing and may further be configured to point towards the rear and side of the vehicle and thus may be able to capture image data of rear and side vehicle surroundings. The captured image data may then be displayed to an operator by display device 510. Blending mirrors and cameras into a side body of a vehicle may increase safety by potentially providing a wider field of view for the operator. Furthermore, placing the first portion of the blended mirror camera display system inside the cabin of the vehicle may also improve fuel efficiency by potentially reducing a substantial amount of drag from the mirrors and thus possibly making the vehicle more aerodynamic. It may be contemplated that a 2% improvement on fuel efficiency may be achieved.

Figure 6:
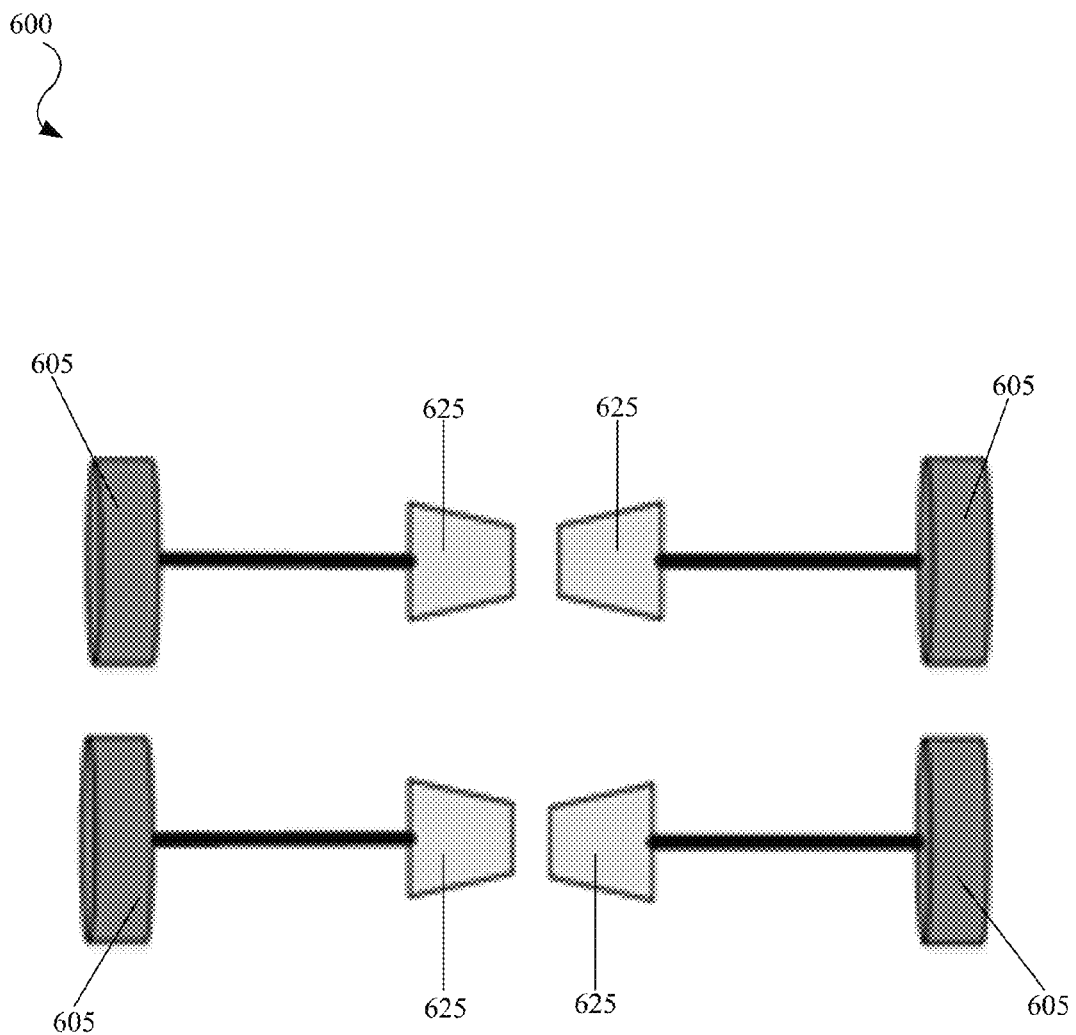
FIG. 6 illustrates some exemplary pneumatic power system components in accordance with an embodiment of the present invention.

FIG. 6 illustrates some exemplary pneumatic power system components 600, in accordance with an embodiment of the present invention. In the present illustrative embodiment, the pneumatic power system components may include four wheels 605, wherein each wheel may be moveably connected to its own individual axel thus forming a multiplicity of wheel axel pairs. Furthermore, the pneumatic power system components may further include four pneumatic motors 625, wherein each wheel axel pair may be operably connected to one of the motors without an intervening transmission or multiple drive train shafts. By eliminating a transmission, it may be contemplated that time may be saved on manufacturing costs and also improve efficiency. A pneumatic powertrain as illustrated by the teachings of the present invention may have more efficiency due to much less friction from mechanical systems.

Figure 7:
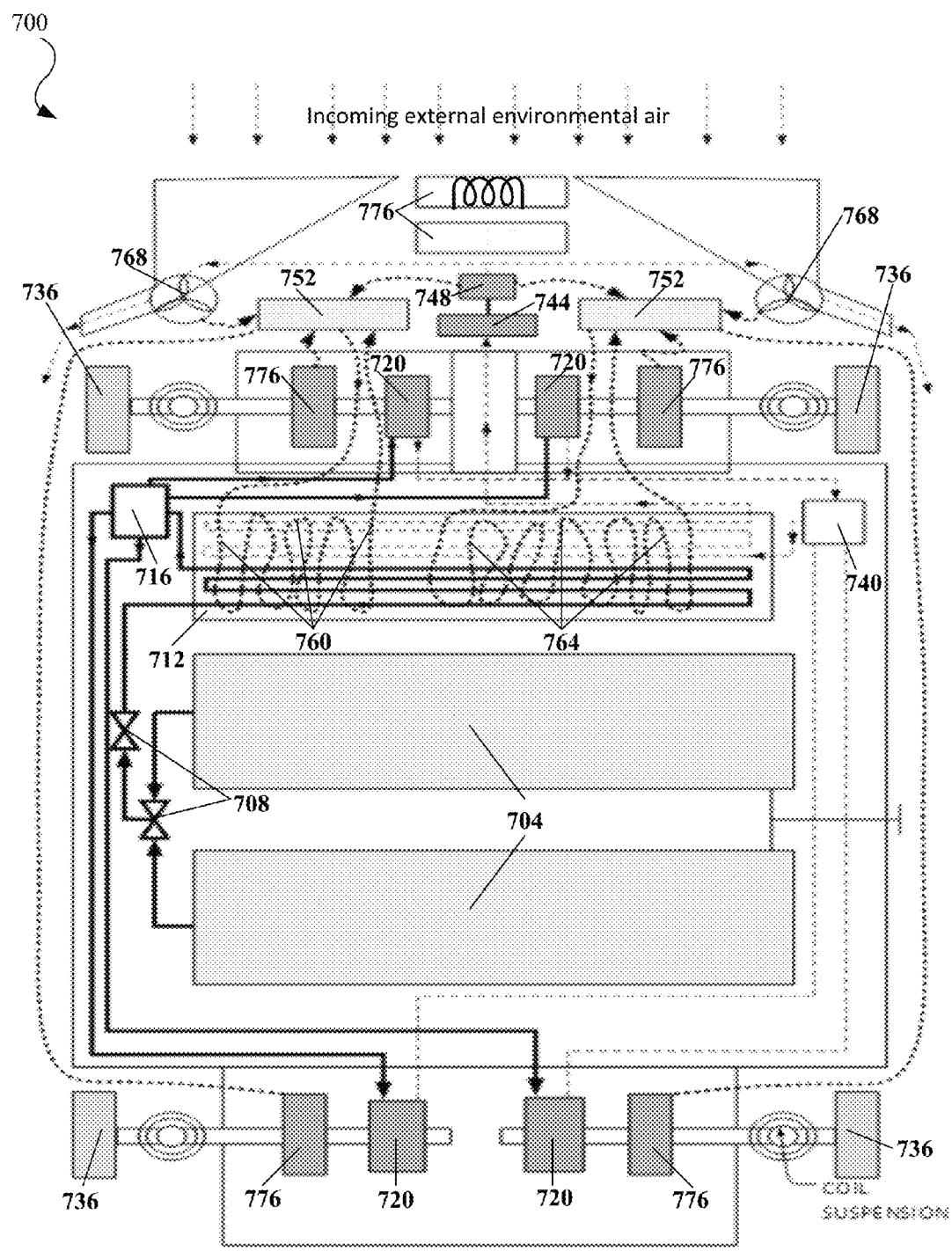
FIG. 7 illustrates a top view of another embodiment of a pneumatic power system of a vehicle, in accordance with an embodiment of the present invention.

FIG. 7 illustrates a top view of another embodiment of a pneumatic power system 700 of a vehicle, in accordance with an embodiment of the present invention. In the present embodiment the pneumatic power system may include a multiplicity of air storage device 704, a regulator device 708, wherein the regulator device may be configured to be a double stage pressure regulator. Furthermore, the regulator device may reduce gas pressure from the gas storage device from an exemplary, without limitation, maximum pressure of 13,000 psi, to an exemplary, without limitation, pressure of 300 psi.

In the present embodiment, the pneumatic power system may further include a heating unit 712, wherein the heating unit may heat the 300 psi gas to an optimum operating temperature. The pneumatic power system may further include a multidirectional output valve 716, wherein the heated gas may be inputted and simultaneously distributed to four pneumatic motors 720, wherein each motor may be directly and operably connected to a respective axel of a multiplicity of wheel 736. The pneumatic motors may be configured to be, for example, and without limitation, expansion type pneumatic motors, wherein, in each pneumatic motor, energy may be transferred from the air to rotate the respective connected axel, which may cause the air to cool and expand as the gas may approach an exit of each pneumatic motor.

The pneumatic power system may also include an exhaust multidirectional valve 740, wherein the exiting air (exhaust) from each of the pneumatic motors may be directed towards and collected in the exhaust multidirectional valve. The exhaust multidirectional valve may be configured to direct the collected exhaust back toward the first heating unit 712 to be reheated.

In the present embodiment, the pneumatic power system may further include an exhaust motor 744 and a first generator 748, wherein reheated gas may be directed toward and through an exhaust motor, thus turning the exhaust motor. Moreover, the exhaust motor may be operably coupled to the first generator 748, wherein the turning of the exhaust motor may cause the first generator to produce and output an electrical charge.

In some embodiments, the pneumatic power system may include a multiplicity of batteries 752. In some alternative embodiments the multiplicity of batteries may be arrange in a multiplicity of arrangements over a multiplicity of locations to suit the needs of particular applications.

In the present embodiment, the pneumatic system may include a first and second battery 752, wherein the batteries may be position as required. Furthermore, in the present embodiment, the electrical charge outputted by the first generator may be sent to both the batteries. The pneumatic power system may further include a heat element, wherein the heat elements may be operably coupled to the heating unit 712 to provide heat to the heating unit. The heating element may also be operably coupled to the first and second batteries 752 respectively.

In the present embodiment, the pneumatic power system may also include impellers 768, wherein each impeller. The generators may be configured to generate electricity when an air passes the impeller. In the present embodiment, the vehicle comprising the pneumatic power system may be configured to allow external environmental air from outside the vehicle to enter a front grill portion of the vehicle and be directed pass the impellers 768 and the heat pump 776 and auxiliary heating element simultaneously. The air passing the impellers may cause the impellers to rotate which may further cause the generators to produce electric charge. The air passing the heat pump may further be directed to a windshield of the vehicle or into a cabin of the vehicle to possibly provide heating or cooling and further possibly reduce drag. Impeller generator 768 may provide the produced electrical charge to batteries 752. Those skilled in the relevant art, in light of the teachings of the present invention, may readily recognize that the location arrangement and operable coupling configuration of the batteries with respect to generators may be changed to suit the needs of particular applications.

In the present embodiment, exhaust motor 748 may further provide exhaust air to the front of the vehicle so that, incoming external environmental air may mix with the exhaust air and be directed toward the impellers. Furthermore, the combined mixture may further be directed towards front tires of the vehicle to potentially reduce drag.

In the present embodiment, the pneumatic power system may further include four electric motors 776, wherein each electric motor may be operably coupled to a respective wheel axel. Furthermore, each electric motor may be actuated, in response to an operator pressing a brake, to provide regenerative braking to the vehicle, wherein regenerative braking may slow a traveling speed of the vehicle while simultaneously causing each of the electric motors to produce electrical charge. In some embodiments, each of the electric motors may further be configured to provide the produced electric charge to batteries 752 of the pneumatic power system. Those skilled in the relevant art, in light of the teachings of the present invention, may readily recognize that the location arrangement and operable coupling configuration of the batteries with respect to the electric motors may be changed to suit the needs of particular applications.

Figure 8:
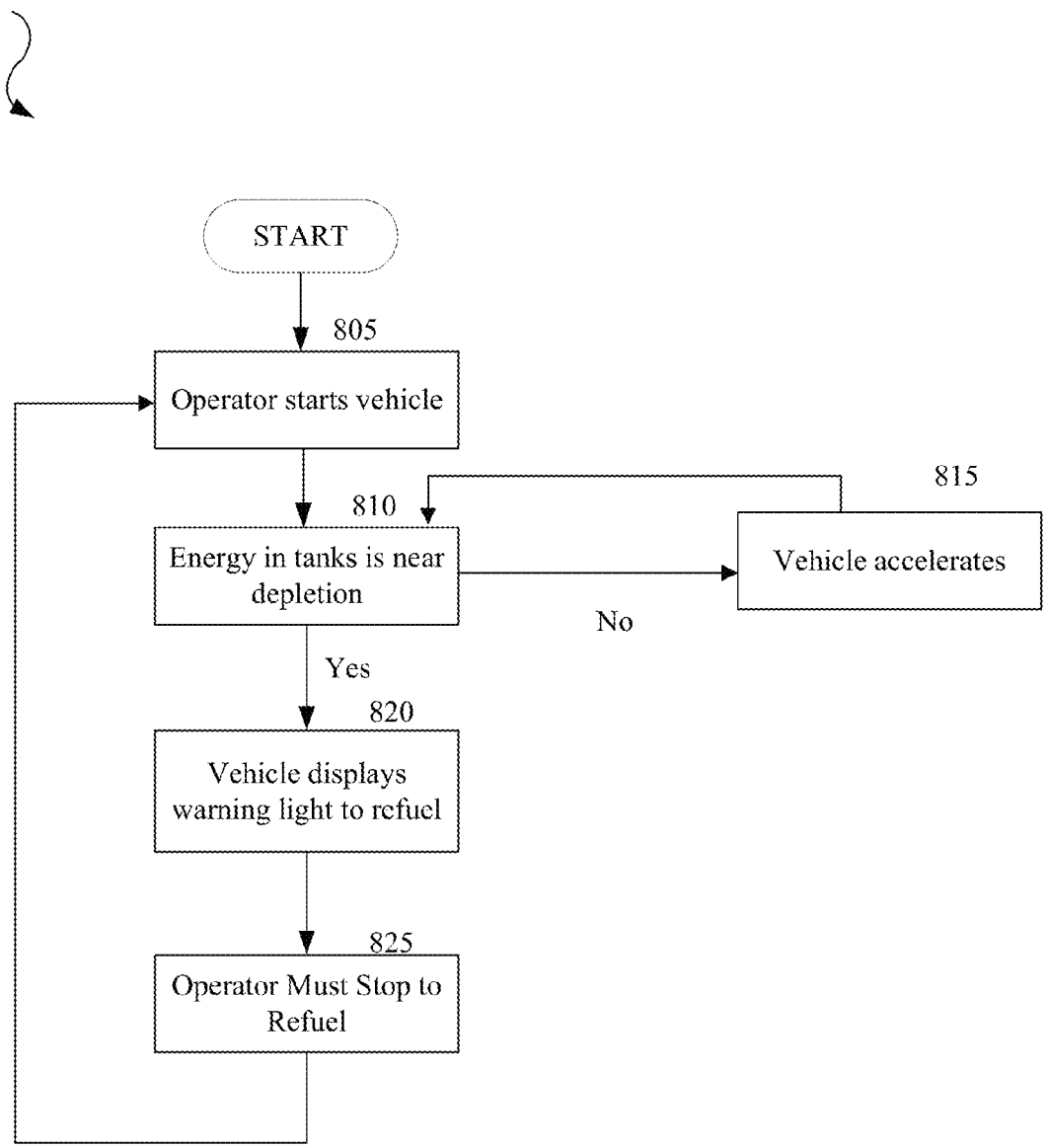
FIG. 8, illustrates an exemplary method embodiment of using an exemplary pneumatic power system vehicle, in accordance with an embodiment of the present invention.

In the present embodiment, actuation and operation of the electric motors may cause the electric motors to become heated, therefore, it may be contemplated that the combined mixture of environmental air and exhaust gas may further be directed towards front electrical motors to possibly cool the front electric motors. four electric motors 184. In some embodiments of the present invention two turbine/expansion cascaded systems may be integrated with an inter-stage reheater. At a highest pressure, air may be expanded in pneumatic motors which may be the most compact. At a lowest pressure, air collected from a multiplicity of vehicle components may be expanded in a single larger-size air turbine. It may be contemplated that reheating two cascaded expansion stages may be optimal because more work may be retrieved and icing of an exhaust pipe while air cools down during expansion may be avoided. The inter-stage reheater may require a special design because the inter-stage reheater may operate at temperatures close to an ambient temperature in order to reheat large volumes of air FIG. 8 illustrates an exemplary method embodiment 800 of using an exemplary pneumatic power system vehicle, in accordance with an embodiment of the present invention. In the present embodiment, and with reference to FIG. 1, an operator may start a vehicle, in a step 805, wherein the vehicle may be configured with an exemplary, and without limitation, pneumatic power system as illustrated in FIG. 1. Next, the operator may apply pressure to an acceleration pedal of the vehicle. In response to pressure possibly being applied to the acceleration pedal, gas storage 104 may release compressed air into the pneumatic power system if air is available, ill a step 810. After the compressed air may travel through regulator device 108, first heating unit 112, and multidirectional output valve 116, the compressed air may travel through each of pneumatic motors 120, which may cause the vehicle to accelerate, in a step 815. While the vehicle may be accelerating, the pneumatic motors may output exhaust air to the exhaust motor 140, via exhaust multidirectional valve 136 The exhaust gas may cause the exhaust motor to energize the first generator 144 and produce electrical charge for battery 168. While the vehicle may be traveling, and/or while pressure may be applied to the acceleration pedal, the battery may continue to be charged via external environmental air entering the intake grill system and generator. After traveling a desired distance, the operator may decide to apply pressure to a brake pedal of the vehicle. Applying the brake pedal may engage electric motors 184. The electric motors may begin to slow a traveling speed of the vehicle. As the electrical motors may slow the vehicle, they may also produce an electric charge that may be outputted to the battery in. An operator may continue to apply pressure to the brake pedal, wherein continued pressure may further engage the electric motors, causing the electric motors to further slow the vehicle, as well as further produce and output electrical charge to the battery. The operator may completely depress the brake pedal. Completely depressing the brake pedal may actuate disc braking to potentially stop wheel motion completely. The operator may decide to continue driving. Processing may continue back to step 810 and the process may be repeated until the operator may have reached a desired destination, may need to refuel in step 825 or may have decided to stop.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing a pneumatic powering system according to the present invention will be apparent to those skilled in the art. Various aspects of the invention have been described above by way of illustration, and the specific embodiments disclosed are not intended to limit the invention to the particular forms disclosed. The particular implementation of the pneumatic powering system may vary depending upon the particular context or application. By way of example, and not limitation, the pneumatic powering system described in the foregoing were principally directed to providing a compressed air and direct powertrain powering system to a car implementation; however, similar techniques may instead be applied to providing a compressed gas direct powertrain powering system to motorcycles, boats, airplanes, and trains, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:
1. A system, comprising:
a power system comprising at least one air and at least one electric motor in communication with each wheel axle, said power system being configured as a power train, wherein each of said motors is configured to transmit power to its associated wheel;
a heat exchanger to heat expanding air, said heat exchanger being configured to be operable to substantially evenly distribute said heated air to actuate at least one pneumatic motor associated with four wheels of a vehicle;
at least one air tank, said at least one air tank being substantially sufficiently covered by tank heat trace lines so as to maintain a desired level of tank heat;
a regeneration brake mechanism configured to actuate four electric motors to convert mechanical braking energy into electricity for recharging batteries and/or directly transferred into said heat exchanger as needed; and, a two turbine/expansion cascaded system integrated with interstage reheaters to increase power to air motors and electrical regeneration.

2. The system of claim 1, in which the vehicle further includes a drag reducing arrangement configured to blend mirrors with camera into vehicle body.

3. The system of claim 1, in which the vehicle further includes active aerodynamic with air intake grids configured to divert air toward vehicle wheels and windshield.

4. The system of claim 1, in which the vehicle further includes an aerodynamic power regeneration system in which air from front grid turns impellers to generate power for battery recharging.

5. The system of claim 1, in which the vehicle further includes a cabin cooling and heating system comprising at least a heat pump system configured to provide heating and cooling.

6. The system of claim 1, in which the vehicle further includes a station for rapid filling of tanks with dry air.

7. The system of claim 1, in which the vehicle further includes a plug-in option for a 120-volt trickle charge system configured for overnight battery charging and a DC quick charge system for quick charging of batteries.

8. The system of claim 1, in which the heat exchanger is configured to employ phase change materials as thermal storage for heating expanding air.

9. The system of claim 1, in which individual pneumatic motors controlling each wheel eliminates need for conventional engine, transmission and powertrain which creates greater efficiency due to reduced mechanical friction losses.

10. The system of claim 1, in which two cascaded expansion stages are reheated to at least one of retrieve more work and avoid icing of exhaust pipe.

11. A system comprising:
a wheeled vehicle propelled by operation of a compressed air system, the vehicle comprising:
a plurality of pneumatic motors, one each pneumatic motor connected to each wheel, the pneumatic motors configured to use compressed air to drive each wheel; and
a plurality of electric motors, one each electric motor connected to each wheel, the electric motors configured to execute regeneration braking;
a heat exchanger to heat expanding air, said heat exchanger being configured to be operable to substantially evenly distribute said heated air to the plurality of pneumatic motors; and
a multi-stage expansion system comprising at least the plurality of pneumatic motors configured as a powertrain, wherein each of said plurality of pneumatic motors is configured to transmit power to its associated wheel.

12. The system of claim 11, in which the heat exchanger is configured to employ phase change materials as thermal storage for heating expanding air.

13. The system of claim 11, in which individual pneumatic motors controlling each wheel eliminates need for conventional engine, transmission and powertrain which creates greater efficiency due to reduced mechanical friction losses.

14. The system of claim 11, in which exhaust from the compressed air system powers a turbine operable to drive a generator to provide electricity to battery systems.

15. The system of claim 11, in which during operation of the vehicle by the compressed air system, air heated by a heat exchanger is distributed substantially evenly to each of the pneumatic motors and in which a valve at each wheel adjusts air flow to the wheel's corresponding pneumatic motor during turning of the vehicle.

16. The system of claim 11, in which the electrical system is recharged by one direct current (DC) quick charge and a 120-volt trickle charge system.

17. The system of claim 11, in which air from a front grill is diverted to impellers configured to turn electric generators to regenerate power and diverts to wheels and windshield to reduce drag.

18. The system of claim 17, in which air at least entering the front grill is further exhausted in front of front wheels which diverts oncoming air around the front wheels and further reduces drag.

19. The system of claim 11, in which mirrors and cameras are blended into a side body of the vehicle promoting at least one of a wider field of operator view and reduced drag.

* * * * *